United States Patent
Sasscer et al.

(10) Patent No.: US 8,920,062 B2
(45) Date of Patent: Dec. 30, 2014

(54) EJECTION JACK RELEASE MECHANISM

(75) Inventors: Gary Sasscer, Leaf River, IL (US);
David J. Lang, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 294 days.

(21) Appl. No.: 13/245,026

(22) Filed: Sep. 26, 2011

(65) Prior Publication Data

US 2013/0078026 A1 Mar. 28, 2013

(51) Int. Cl.
*B64D 41/00* (2006.01)

(52) U.S. Cl.
CPC ..................................... *B64D 41/007* (2013.01)
USPC ......................................... 403/322.1; 244/58

(58) Field of Classification Search
USPC ............... 244/58; 415/122.1, 124.1; 416/142; 403/321, 322.1, 322.3, 325
See application file for complete search history.

(56) References Cited

U.S. PATENT DOCUMENTS

| | | | | |
|---|---|---|---|---|
| 920,820 | A * | 5/1909 | Brown | 187/307 |
| 2,764,132 | A | 9/1956 | Bakke | |
| 3,149,678 | A | 9/1964 | Chilman et al. | |
| 3,312,487 | A * | 4/1967 | McIntyre | 403/322.3 |
| 4,043,687 | A * | 8/1977 | Van Dyke et al. | 403/109.3 |
| 4,489,904 | A | 12/1984 | Soederberg | |
| 4,676,458 | A | 6/1987 | Cohen | |
| 4,742,976 | A | 5/1988 | Cohen | |
| 4,991,796 | A | 2/1991 | Peters et al. | |
| 5,123,614 | A | 6/1992 | Whitehouse | |
| 5,398,780 | A | 3/1995 | Althof et al. | |
| 5,820,074 | A | 10/1998 | Trommer et al. | |
| 7,416,392 | B2 * | 8/2008 | Russ | 416/142 |
| 7,419,357 | B2 | 9/2008 | Nohr et al. | |
| 2009/0121077 | A1 | 5/2009 | Lynas et al. | |
| 2011/0171019 | A1 * | 7/2011 | Provost | 403/321 |

FOREIGN PATENT DOCUMENTS

| | | | | |
|---|---|---|---|---|
| FR | 2 614 947 | * 11/1988 | | 403/321 |
| WO | 8702642 | 5/1987 | | |

* cited by examiner

*Primary Examiner* — Michael P Ferguson
(74) *Attorney, Agent, or Firm* — Carlson, Gaskey & Olds, P.C.

(57) ABSTRACT

An example release mechanism for an ejection jack includes a locking mechanism disposed about an axis. A pivotable first leg is connected to a pivotable second leg by a crossbar. A blocking pin is rotatably connected to the first leg and the second leg such that the locking mechanism abuts the blocking pin. A first solenoid includes a first rod abutting one of the first leg or the second leg. The first rod extends a first distance perpendicular to the axis and is configured to exert a first force to push the first leg and second leg away from the solenoid. The first leg and second leg are configured to pivot away from the first solenoid such that the blocking pin no longer abuts the locking mechanism.

20 Claims, 8 Drawing Sheets

EJECTION JACK RELEASE MECHANISM

BACKGROUND

This application relates to ram air turbines, and specifically a release mechanism of an ejection jack for deployment of a ram air turbine.

Ram air turbines are generally used to provide emergency auxiliary power upon failure of engines of an aircraft, or in response to other needs of the aircraft. Ram air turbines are generally stowed in an inactive position within an aircraft. When necessary, the ram air turbine is deployed using an ejection jack. Ejection jacks typically include a release mechanism to allow deployment of the ram air turbine.

SUMMARY

An example release mechanism for an ejection jack includes a locking mechanism disposed about an axis. A pivotable first leg is connected to a pivotable second leg by a crossbar. A blocking pin is rotatably connected to the first leg and the second leg such that the locking mechanism abuts the blocking pin. A first solenoid includes a first rod abutting one of the first leg or the second leg. The first rod extends a first distance perpendicular to the axis and is configured to exert a first force to push the first leg and second leg away from the solenoid. The first leg and second leg are configured to pivot away from the first solenoid such that the blocking pin no longer abuts the locking mechanism.

An example ejection jack for a ram air turbine includes a first axial end configured to connect to a ram air turbine and a second axial end configured to connect to an aircraft. A housing is provided and a release mechanism is disposed at least partially within the housing. The release mechanism includes a locking mechanism disposed about an axis, a pivotable first leg connected to a pivotable second leg by a crossbar. The release mechanism also includes a blocking pin rotatably connected to the first leg and the second leg and abutting the blocking pin. The release mechanism further includes a first solenoid having a first rod abutting one of the first leg or the second leg. The first rod extends a first distance perpendicular to the axis, wherein the first rod is configured to exert a first force to push the first leg and second leg away from the solenoid. The first leg and second leg are configured to pivot away from the first solenoid such that the blocking pin no longer abuts the locking mechanism.

An example method of installing a release mechanism in an ejection jack for a ram air turbine includes providing first and second legs pivotably moveable relative to an axis and a blocking pin defining a diameter and rotatably supported between the first and second legs. The blocking pin is parallel to the axis connecting the first leg and the second leg. A locking mechanism disposed about the axis is aligned such that the locking mechanism abuts the blocking pin. At least one solenoid having a rod is supported such that the rod abuts one of the first leg and the second leg. The rod is configured to push the first leg and the second leg such that the first leg and the second leg pivot and the locking mechanism no longer abuts the blocking pin.

These and other features of the present disclosure can be best understood from the following specification and drawings, the following of which is a brief description.

DETAILED DESCRIPTION

Figure 1:
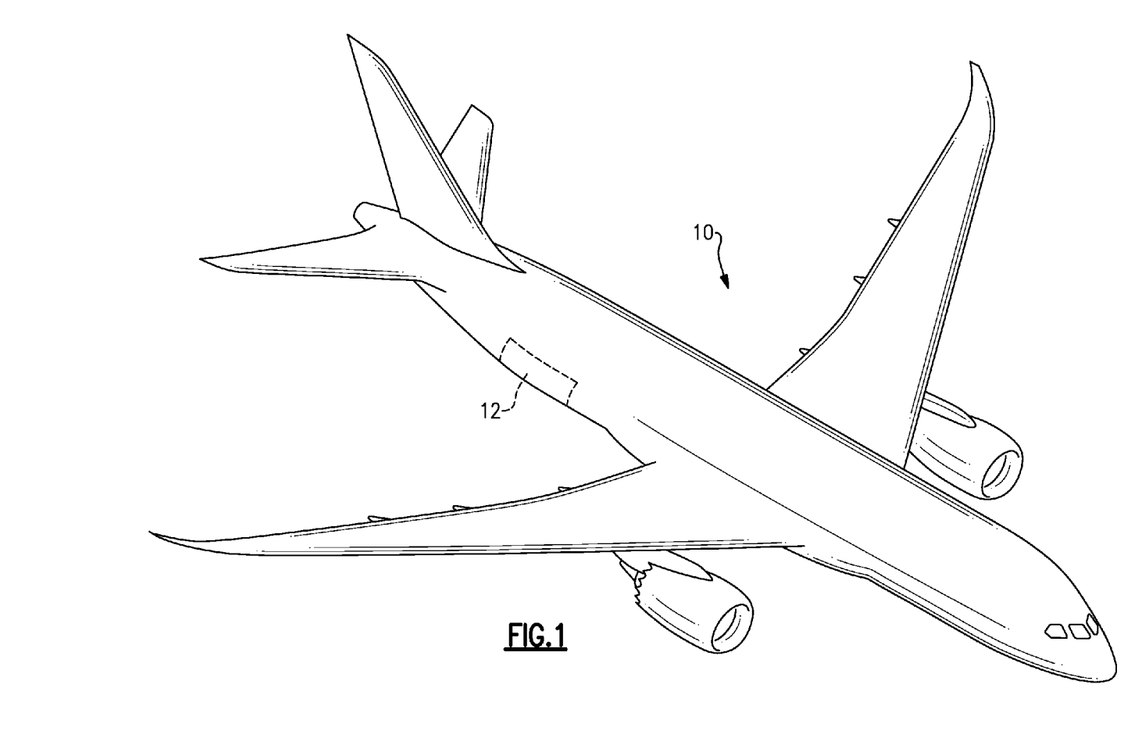
FIG. 1 is a perspective view of an example aircraft.
Figure 2:
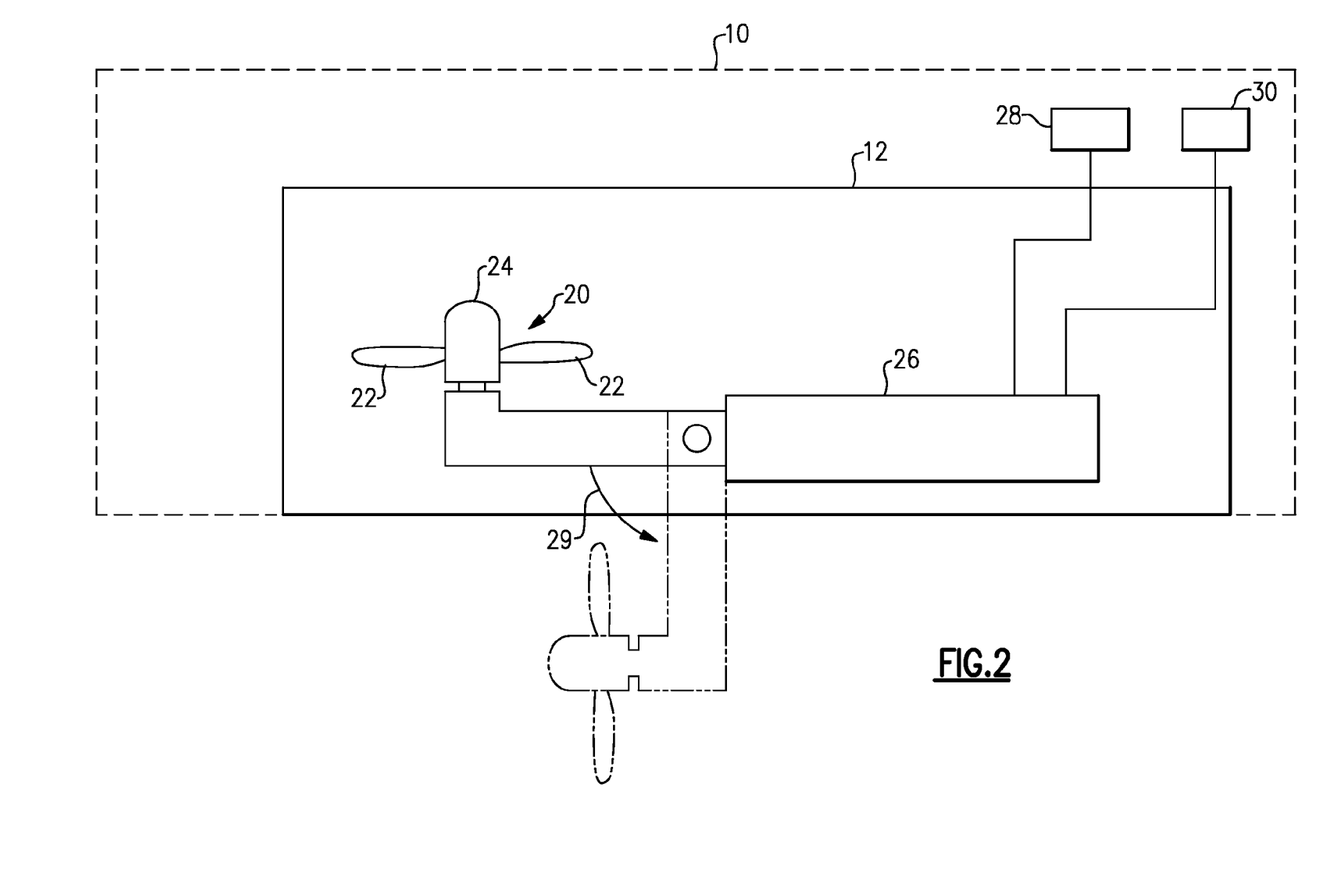
FIG. 2 is a perspective view of an example ram air turbine compartment of the aircraft of FIG. 1.

Referring to FIGS. 1 and 2, an aircraft 10 includes a ram air turbine 20 disposed in a compartment 12 in a stowed position. The ram air turbine 20 includes a rotatable hub 24 and a plurality of blades 22 disposed on the hub 24 which cause the hub 24 to rotate in the airstream outside the aircraft 10. The ram air turbine 20 is inactive when in a stowed position. The ram air turbine 20 is connected to a deployment mechanism, such as an example ejection jack 26, shown schematically. The ejection jack 26 is connected to both the aircraft 10 and the ram air turbine 20 and effectuates movement of the ram air turbine 20 from a stowed position to a deployed position outside of the compartment 12 and in the airstream, as indicated by arrow 29. Once in a deployed position, blades 22 are rotated in the airstream and rotate the hub 24, to provide additional power to the aircraft 10.

The ejection jack 26 is in communication with an aircraft control system 28 and a manual pilot system 30, shown schematically. The manual pilot system 30 provides a manually activated signal to release the ram air turbine 20. The aircraft control system 28 provides an automatically activated signal to release the ram air turbine 20 in response to detection of engine failure, or other circumstance requiring use of the ram air turbine 20. The aircraft control system 28 and manual pilot system 30 can be used individually or together, to send a signal to solenoids 57 (FIG. 3) of the ejection jack 26 to release the ram air turbine 20, as will be described in further detail below. Each signal may excite a voltage in one or both solenoids 57, depending on aircraft 10 logic.

Figure 3:
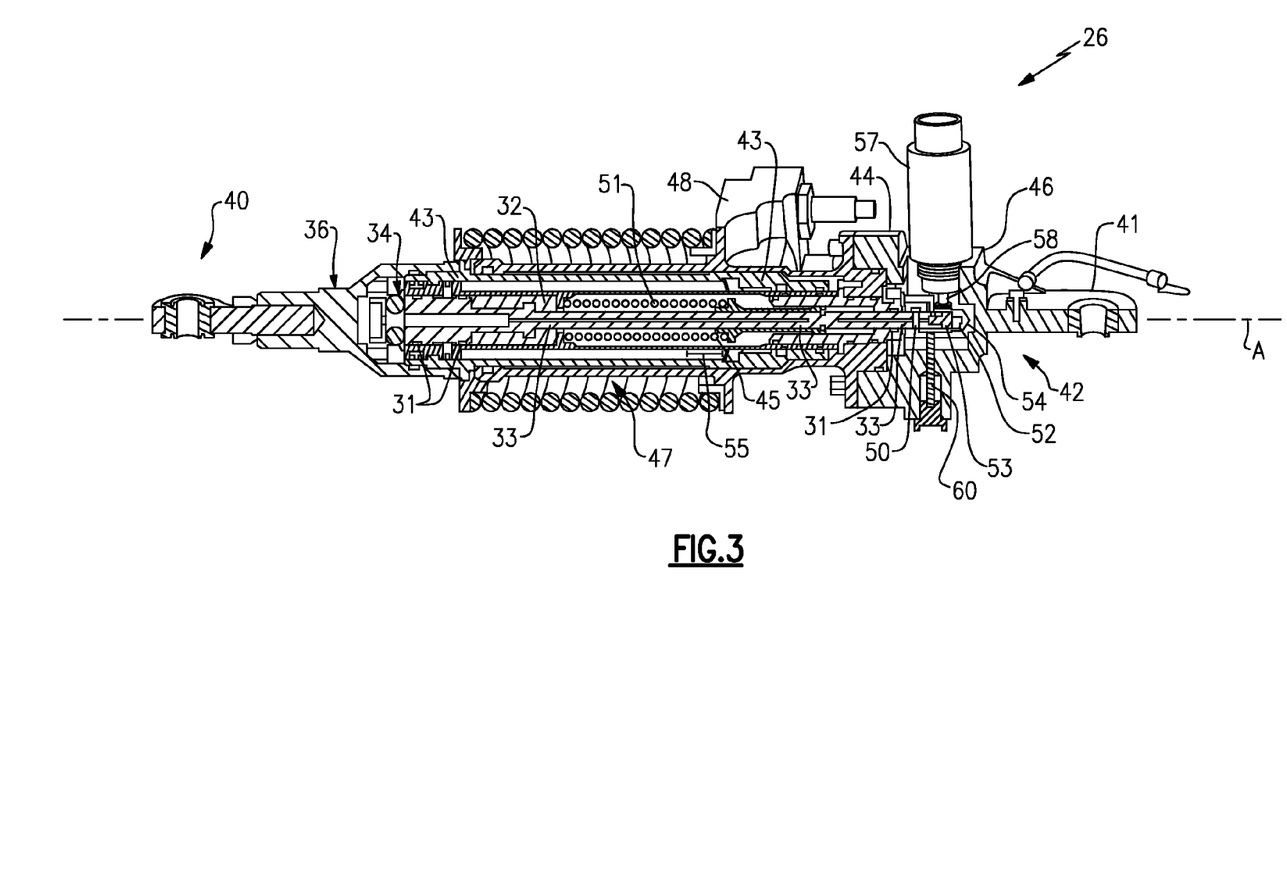
FIG. 3 is a cross sectional view of an example ejection jack for a ram air turbine.

Referring to FIG. 3, with continued reference to FIG. 2, an example ejection jack 26 is disposed about axis A and includes a ram air turbine attachment component 40 for attaching the ram air turbine 20 to the ejection jack 26 and an aircraft attachment component 41 for attaching the ejection jack 26 to the aircraft 10. The ram air turbine attachment component 40 and aircraft attachment component 41 are at opposing axial ends. The ejection jack 26 includes a release mechanism 42 at least partially within a first housing 44. The release mechanism includes a locking mechanism 33 including a bolt 50 and contacting pin 53. The locking mechanism 33 extends from a chamber 32 in the second housing 48. The locking mechanism 33 is loaded by spring 51 and prevented from axial movement by blocking pin 52. Seals 31 are provided along the locking mechanism 33 and create drag during loading of spring 51, and axially rearward extension of lock mechanism 33. When the release mechanism 42 of the ejection jack 26 unlocks, the locking mechanism 33 moves axially rearward past blocking pin 52. As a result, a blocking portion 34 releases such that cylinder 43 loaded by spring 47 in a second housing 48 is freed to slide axially forward. Cylinder 43 is attached to engagement section 36. As a result of the cylinder 43 sliding forward, the engagement section 36 moves axially forward (not shown) to force the ram air turbine 20 to rotate from the stowed position to the deployed position. In one example, the size of the spring 51 is determined based on the drag of seals 31 and compression from blocking pin 52.

Figure 4A:
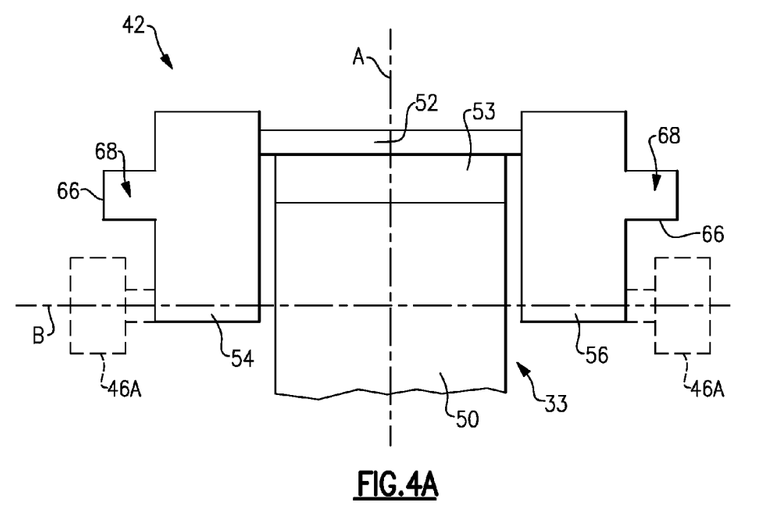
FIG. 4a is a top view of the example release mechanism without solenoid or plunger.
Figure 4B:
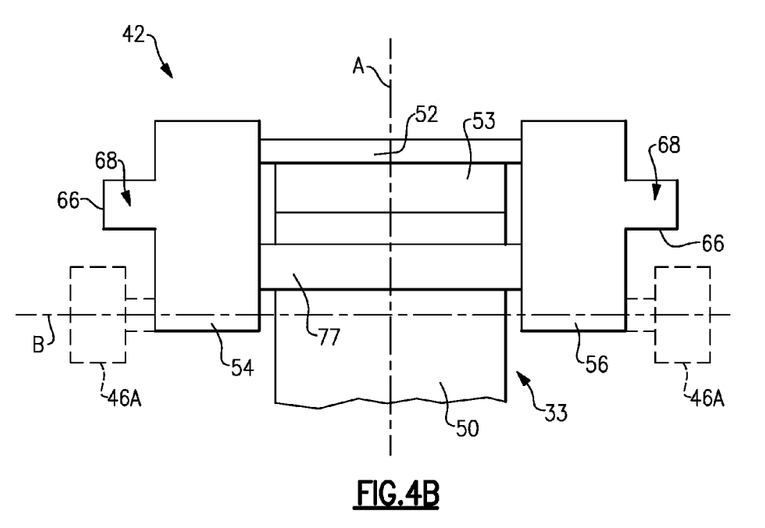
FIG. 4b is a bottom view of the example release mechanism without solenoid or plunger.
Figure 5:
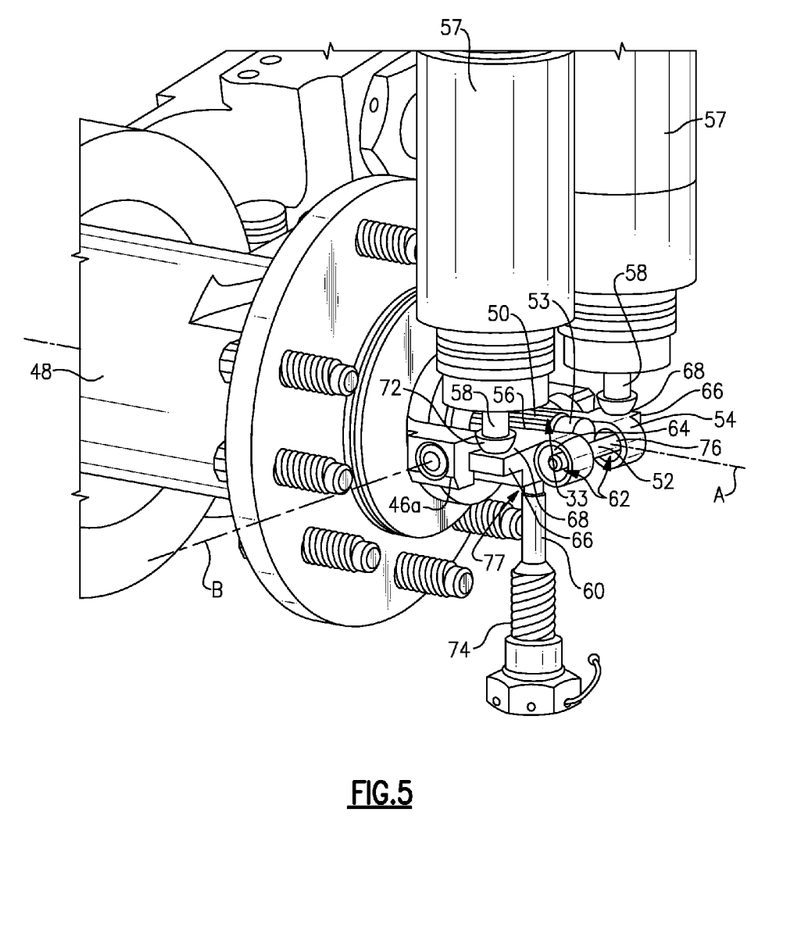
FIG. 5 is a perspective view of an example release mechanism of the example ejection jack of FIG. 3 in a stowed position.

Referring to FIGS. 4a-4b and 5, with continued reference to FIGS. 2 and 3, the example release mechanism 42 includes the locking mechanism 33 comprising the bolt 50 and contacting pin 53 attached to an axial end of the bolt 50. The release mechanism 42 also includes the blocking pin 52, which is supported between a first leg 54 and a second leg 56. At least one solenoid 57 includes a rod 58 for moving the first leg 54 and second leg 56. A spring loaded plunger 60 biases the first leg 54 and second leg 56 in a direction opposite the solenoid 57. The locking mechanism 33 is loaded via the spring 51 to move in an axial rearward direction.

The bolt 50 has the contacting pin 53 attached at the aft axial end that abuts the blocking pin 52, preventing release of bolt 50 and contacting pin 53 in an axially rearward direction. The blocking pin 52 is disposed between the first leg 54 and the second leg 56. Each of the first leg 54 and second leg 56 include an opening 62. The blocking pin 52 extends into the respective openings 62 disposed in each of the first leg 54 and the second leg 56 and is attached using a bearing 64 to allow rotation via rolling of the blocking pin 52. In the illustrated example, the bearings 64 are needle bearings. However, other bearings 64 may be used.

A cross bar 77 extends between the first leg 54 and second leg 56 and attaches the first leg 54 and the second leg 56 such that the legs 54, 56 move together. The first leg 54 and second leg 56 are each pivotally mounted to a portion 46a of the first housing 46. Each of the first leg 54 and second leg 56 include a flange 66 having an upper surface 68 in contact with the rod 58 of a solenoid 57. The flanges 66 extend radially outward of respective legs 54, 56. The blocking pin 52 is connected between the first leg 54 and the second leg 56 such that the first leg 54, second leg 56, and blocking pin 52 move together when force is exerted by rod 58 on the flange 66 of either leg 54, 56. The first leg 54 and second leg 56 each pivot about axis B.

The example release mechanism 42 includes two solenoids 57. However, it is within the contemplation of this disclosure to use only one solenoid 57. Each solenoid 57 includes a rod 58 which extends downward from respective solenoid 57 and contacts the flange 66 of one of the first leg 54 or second leg 56. When the solenoid 57 is signaled to deploy, a voltage spike occurs in the solenoid 57 causing downward motion of the rod 58. When the solenoid 57 forces the rod 58 downwards, the force exerted on the flanges 66 forces the first leg 54, second leg 56, and blocking pin 52 to pivot downwards causing the blocking pin 52 to roll along the end of the locking mechanism 33. As the blocking pin 52 reaches the corner at radius 80, the blocking pin 52 exerts a force which compresses spring 51 a distance 55. The solenoid 57 must overcome the rearward biasing of the spring 51, drag from seals 31, frictional forces from the blocking pin 52 rolling against the lock mechanism 33, and pivoting of the first leg 54 and second leg 56 causing friction from rod 58 sliding along flanges 66 to move the blocking pin 52.

The downward motion of the rod 58 is sufficient to cause the blocking pin 52 to reach the radius 80 (FIG. 6) of the contacting pin 53, after which rearward motion of the locking mechanism 33 becomes self-sustaining under the influence of rearward biasing spring 51, which is sufficiently sized to overcome retarding friction forces of the hydraulic fluid seals 31 on the locking mechanism 33. The blocking pin 52 continues to roll along the end of the locking mechanism 33 until clearing the locking mechanism 33, such that the bolt 50 and contacting pin 53 roll over the blocking pin 52. Thus, the locking mechanism 33 releases and extends axially aft. Neither solenoid 57 prevents the other from forcing respective rod 58 downwards and releasing the locking mechanism 33.

In one example, each rod 58 includes a first end 72 which is contacting the upper surface 68 of the flange 66. In one example, the first end 72 is hemispherically shaped, however, other shapes are within the contemplation of this disclosure.

In one example, the size of solenoids 57 is determined in response to one or more of the size of spring 51 and drag from seals 31.

The release mechanism 42 also includes a spring loaded plunger 60 disposed opposite of the solenoids 57 and rods 58. The spring loaded plunger 60 contacts the cross bar 77 and exerts upward pressure on the bolt 50, perpendicular to axis A. The spring loaded plunger 60 contacts the cross bar 77 along axis A. The spring loaded plunger 60 is loaded by spring 74. When in a stowed position prior to the solenoids 57 forcing the blocking pin 52 down to release the locking mechanism 33, the spring loaded plunger 60 has a minimum spring force sufficient to exert upward pressure on the locking mechanism 33 to prevent unintentional release of the locking mechanism 33 during operation of the aircraft 10. After release of the locking mechanism 33, the spring loaded plunger 60 forces the locking mechanism back into a locked position, corresponding to a stored position of the ram air turbine 20 during reloading of the release mechanism 42.

The release mechanism 42 is at least partially within first housing 44, which is not shown in FIG. 5 for better illustration of the release mechanism 42.

In operation, the solenoids 57 receive a signal to extend their respective rods 58, effectuating release of the locking mechanism. In this example, one solenoid 57 receives an automatic signal from the aircraft control system 28, while the other solenoid 57 receives a manual signal from a manual pilot system 30. This allows manual release of the ram air turbine 20 should the aircraft control system 28 not detect the need for the release of the ram air turbine 20, or should the aircraft control system 28 fail. However, it is within the contemplation of this disclosure to use only one solenoid 57 receiving a signal from one or both of the aircraft control system 28 and manual pilot system 30, or two solenoids 57 receiving a signal from only one of the aircraft control system 28 and manual pilot system 30.

In one example, blocking pin 52 includes a center point 76 disposed along axis A. The contacting pin 53 and bolt 50 of the locking mechanism 33 are centered between the first leg 54 and the second leg 56 with the center of the contacting pin 53 abutting the center point 76 of the blocking pin 52. The spring loaded plunger 60 is similarly situated perpendicular to axis A, and centered between the first leg 54 and the second leg 56.

In one example, a contacting pin 53 is attached to the aft axial end of the bolt 50. The contacting pin 53 is hardened to prevent deformation due to contact with the blocking pin 52. In one example, the contacting pin 53 is formed of Nitrated Rockwell C70. However, other materials may be used.

When the rods 58 of the solenoids 57 push the first leg 54, second leg 56, and blocking pin 52 down, the locking mechanism 33 is released to move axially rearward. The movement of the locking mechanism 33 frees cylinder 43 to slide forward and effectuate release of the ram air turbine 20. The release mechanism 42 unlocks the ram air turbine 20 such that the ram air turbine 20 moves to the deployed position.

The spring 51 loads the locking mechanism 33 such that locking mechanism 33 exerts a force on the blocking pin 52 and the rods 58 of the solenoids 57 exert a force on the first leg 54 and the second leg 56. In one example, a ratio of the force of the locking mechanism 33 to the force of the rod 58 of the solenoid 57 is 10:1. In another example, the force of the rod 58 is determined at least partially by the distance 55 the spring 51 is compressed.

Figure 6:
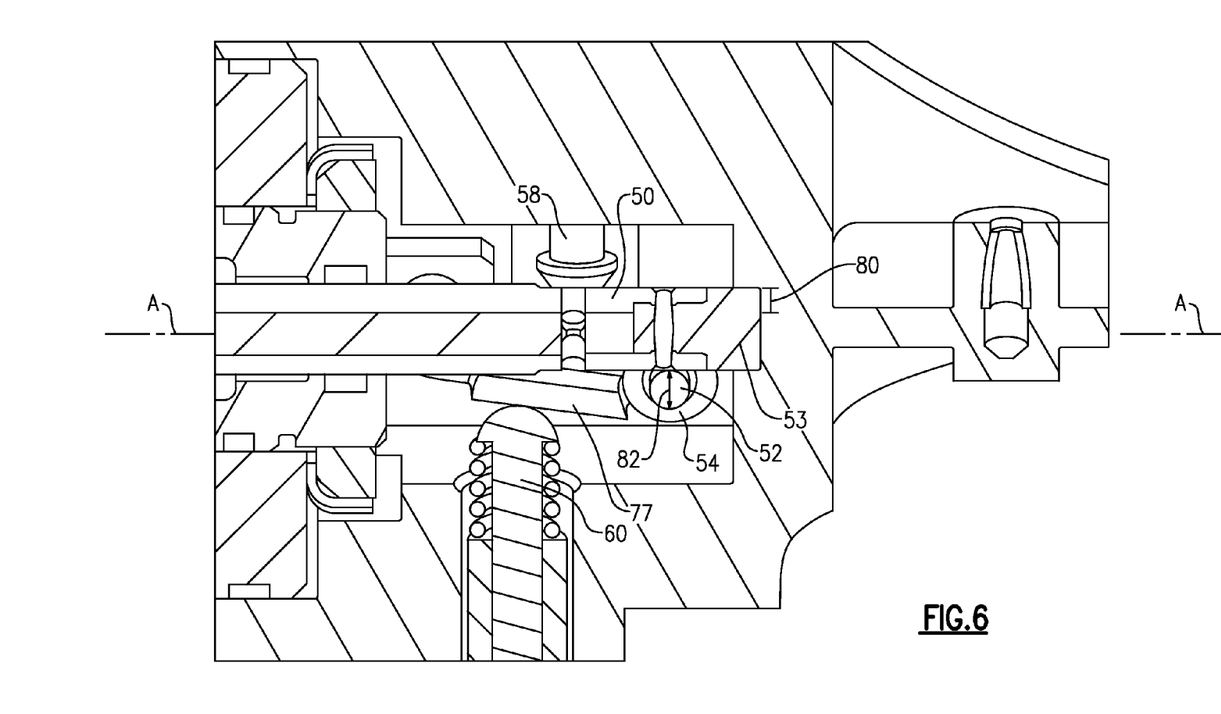
FIG. 6 is a cross sectional view of the example release mechanism of FIG. 4 in a deployed position.

Referring to FIG. 6, with continued reference to FIGS. 4a-4b and 5, the release mechanism 42 is shown in a deployed position corresponding to deployment of the ram air turbine 20. The rod 58 has pushed for the first leg 54 and blocking pin 52 downward, perpendicular to axis A, displacing the blocking pin 52 such that locking mechanism 33 has released and extended axially aft. The spring loaded plunger 60 is exerting an upward force on the cross bar 77 connecting first leg 54 and second leg 56. Although second leg 56 and corresponding rod 58 are not shown, it is contemplated that rod 58 of additional solenoid 57 has similarly pushed second leg 56 down.

In one example, the blocking pin 52 is arranged such that a distance 80 to clear the contacting pin 53 is within the stroke travel of the solenoids 57 to ensure the blocking pin 52 clears the contacting pin 53 and the contacting pin's 53 rearward bias allows it to move axially aft past the blocking pin 52. In one example, the distance 80 is the radius of the bolt 50 and contacting pin 53

Once the ram air turbine 20 is no longer needed by the aircraft 10, the bolt 50 and contacting pin 53 are reloaded and the blocking pin 52 is put back into place such that the blocking pin 52 again prevents the locking mechanism 33 from releasing and moving axially aft. Similarly, the rod 58 is reloaded within the solenoid 57 and the spring loaded plunger 60 exerts force on the cross bar 77 to stop unintentional deployment.

Figure 7:
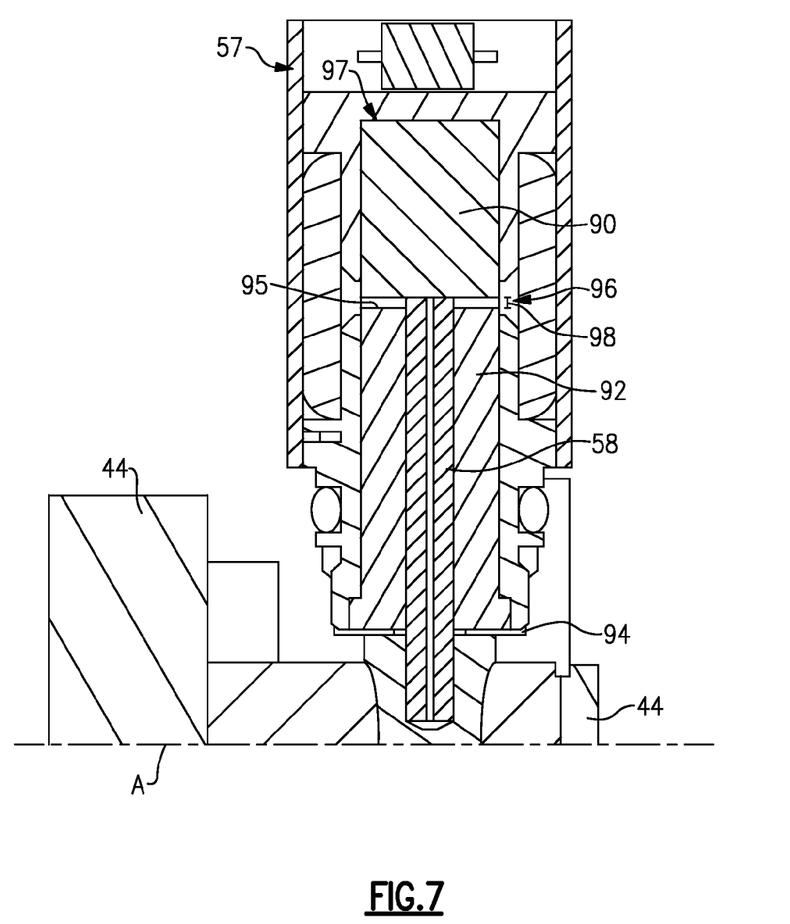
FIG. 7 is a cross sectional view of an example solenoid of the example release mechanism of FIG. 4.

Referring to FIG. 7 with continued reference to FIGS. 4a-4b and 5, an example solenoid 57 includes rod 58. Rod 58 is attached to a piston 90, which is disposed in chamber 95. Solenoid 57 also includes portion 92 defining one end of the chamber 95. In the stowed position, the piston 90 is disposed at an outer radial end 97 of the chamber 95. When the solenoid 57 receives a signal to deploy the ram air turbine 20, the solenoid 57 moves piston 90 downward to force rod 58 downward. A gap 96 is defined in the chamber 95 between the piston 90 and the portion 92 when in the stowed position. Gap 96 defines the length 98 of the stroke of the piston 90, which in turn determines how far down the rod 58 will push the first leg 54 and second leg 56.

Shims 94 are provided to control the height of the solenoid 57 with respect to the first leg 54, second leg 56, and blocking pin 52. The rod 58 has maximum force at the end of the piston 90 stroke. Therefore, shims 94 are used to set the height of the solenoid 57 such that the stroke of the piston 90 will force the first leg 54, second leg 56 and blocking pin 52 downwards far enough to reach distance 80. However, the shims 94 are also set such that the blocking pin 52 is releasing the bolt 50 and contacting pin 53 at the end of the stroke of the piston 90.

Figure 8:
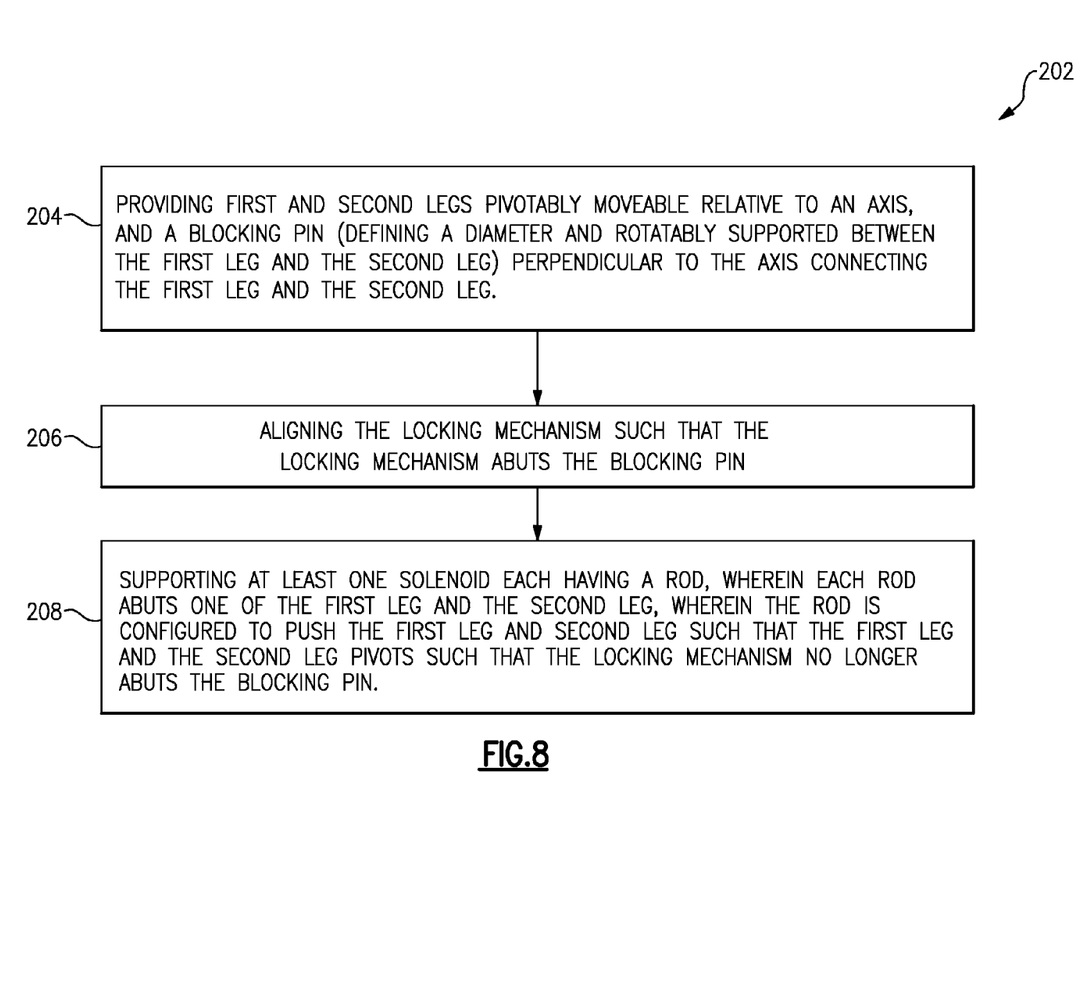
FIG. 8 is a method of installing an example release mechanism of an ejection jack.

Referring to FIG. 8, a method of installing a release mechanism in an ejection jack for a ram air turbine 202 includes providing first and second legs pivotably moveable relative to an axis and a blocking pin defining a diameter and rotatably supported between the first and second legs 204. The blocking pin is perpendicular to the axis connecting the first leg and the second leg 204. A locking mechanism disposed about the axis is aligned such that the locking mechanism abuts the blocking pin 206. At least one solenoid having a rod is supported such that the rod abuts one of the first leg and the second leg 208. The rod is configured to push the first leg and the second leg such that the first leg and the second leg pivot and the locking mechanism no longer abuts the blocking pin 208. In one example, the solenoid is supported by shimming.

Although example embodiment of this invention has been disclosed, a worker of ordinary skill in this art would recognize that certain modifications would come within the scope of this invention. For that reason, the following claims should be studied to determine the true scope and content of this disclosure.

What is claimed is:

1. A release mechanism for an ejection jack comprising:
    a locking pin disposed about an axis;
    a locking pin housing disposed adjacent said locking pin;
    a first leg connected to a second leg by a crossbar and a blocking pin, wherein the blocking in is rotatably supported between the first leg and the second leg;
    each of said first and second legs being pivotably connected to the locking pin housing;
    a first solenoid having a first rod abutting one of the first leg or the second leg, wherein the first rod extends a first distance away from the axis in a first position and a second distance away from the axis in a second position;
    wherein the blocking pin abuts an axial end of the locking pin when the first rod is in the first position and the blocking pin is forced radially outward of the locking pin when the first rod is in the second position; and
    wherein transitioning from the first position to the second position exerts a first force on the first or second leg abutting the first rod.

2. The release mechanism of claim 1, wherein the locking pin exerts a second force on the blocking pin, wherein a ratio of the second force to the first force is 10:1.

3. The release mechanism of claim 1, wherein the locking pin includes a bolt attached to a contacting pin.

4. The release mechanism of claim 3, wherein the contacting pin is formed from a material harder than the bolt.

5. The release mechanism of claim 1, wherein each of the first leg and the second leg includes a flange extending perpendicular to the axis, wherein the first rod abuts one of the flange of the first leg or the flange of the second leg.

6. The release mechanism of claim 5, wherein the first rod of the solenoid abuts the first leg, and further comprising a second solenoid having a second rod, the second rod abuts the second leg.

7. The release mechanism of claim 6, wherein the first solenoid is operable to receive a manually activated signal and the second solenoid is operable to receive an automatically activated signal.

8. The release mechanism of claim 6, further comprising shims setting the first solenoid and the second solenoid a distance away from the blocking pin such that the first rod is configured to push the first leg such that the blocking pin is clear of the locking pin when the first rod is in the second position, and wherein the second rod extends said first distance away from the axis in said first position and said second distance away from the axis in said second position and the second rod is configured to push the second leg such that the blocking pin is clear of the locking pin when the second rod is in the second position.

9. The release mechanism of claim 1, wherein the locking pin further comprises a spring positioned about the axis and compressible such that the first force is determined at least in part by the compression.

10. The release mechanism of claim 1, wherein a spring loaded plunger abuts the cross bar and is configured to bias the cross bar, first leg and second leg towards the solenoid.

11. The release mechanism of claim 10, wherein the spring loaded plunger is centered between the first leg and the second leg and abuts the cross bar at a position along the axis.

12. An ejection jack of a ram air turbine comprising:
a first axial end configured to connect to a ram air turbine;
a second axial end configured to connect to an aircraft;
a ram air turbine housing; and
a release mechanism at least partially within the housing, the release mechanism including:
a locking pin disposed about an axis; a locking pin housing disposed adjacent said locking mechanism;
a first leg connected to a second leg by a crossbar and a blocking pin, wherein the blocking in is rotatably supported between the first leg and the second leg;
each of said first and second legs being pivotably connected to the locking pin housing;
a first solenoid having a first rod abutting one of the first leg or the second leg, wherein the first rod extends a first distance away from the axis in a first position and a second distance away from the axis in a second position;
wherein the blocking pin abuts an axial end of the locking pin when the first rod is in the first position and the blocking pin is forced radially outward of the locking pin when the first rod is in the second position; and
wherein transitioning from the first position to the second position exerts a first force on the first or second leg abutting the first rod.

13. The ejection jack of claim 12, wherein the locking pin exerts a second force on the blocking pin, wherein a ratio of the second force to the first force is 10:1.

14. The ejection jack of claim 12, wherein the ejection jack is configured to move the ram air turbine from a first position to a second position in response to the first rod pushing the one of the first leg or the second leg.

15. The ejection jack of claim 14, wherein the first rod abuts the first leg, wherein a second solenoid has a second rod abutting the second leg configured to exert a third force to push the second leg away from the second solenoid.

16. The ejection jack of claim 15, wherein the first rod contacts the first leg on a first flange extending radially outwards from the first leg, wherein the second rod contacts the second leg on a second flange extending radially outwards of the second leg.

17. The release mechanism of claim 12, wherein the blocking pin is configured to
move to a radius of the locking pin, wherein a spring of the locking pin is configured to compress such that the first force is determined at least in part by the compression.

18. A method of installing a release mechanism of an ejection jack of a ram air turbine comprising:
providing first and second legs connected by a crossbar, each of said first and second legs being pivotably connected to a locking pin housing and being moveable relative to an axis and a blocking pin rotatably supported between the first and second legs parallel to the axis connecting the first leg and the second leg;
aligning a locking pin disposed about the axis such that the locking pin abuts the blocking pin; and
supporting at least one solenoid having a rod, wherein the rod abuts one of the first leg and the second leg, wherein the rod is configured to push the first leg and the second leg such that the first leg and the second leg pivot thereby causing the locking pin to no longer abut the blocking pin.

19. The method of claim 18, wherein the at least one solenoid is supported by shimming.

20. The method of claim 18, further comprising setting a piston attached to each rod such that each piston is disposed at the outer radial end of the solenoid relative to the axis.

\* \* \* \* \*

UNITED STATES PATENT AND TRADEMARK OFFICE
CERTIFICATE OF CORRECTION

| | | |
|---|---|---|
| PATENT NO. | : 8,920,062 B2 | Page 1 of 1 |
| APPLICATION NO. | : 13/245026 | |
| DATED | : December 30, 2014 | |
| INVENTOR(S) | : Sasscer et al. | |

It is certified that error appears in the above-identified patent and that said Letters Patent is hereby corrected as shown below:

IN THE CLAIMS:

Claim 12, column 7, line 10; replace "in" with --pin--

Signed and Sealed this
Ninth Day of June, 2015

Michelle K. Lee
*Director of the United States Patent and Trademark Office*